Jan. 30, 1968 K. BURGER 3,366,720
METHOD OF PRODUCING BUILDING BLOCKS
Filed Feb. 23, 1967
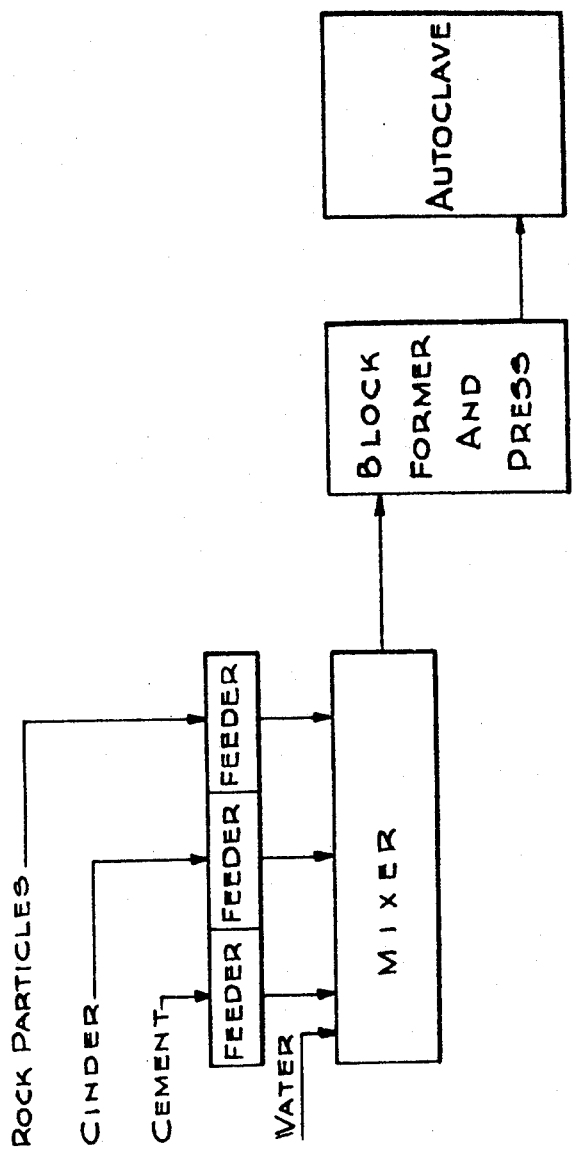
INVENTOR
Karl Burger
BY
Weir, Marshall, MacRae Lamb
PATENT AGENT

United States Patent Office 3,366,720
Patented Jan. 30, 1968

3,366,720
METHOD OF PRODUCING BUILDING BLOCKS
Karl Burger, 56 Hemlock Road, Cardiff, Ontario, Canada
Continuation-in-part of application Ser. No. 428,343,
Jan. 27, 1965. This application Feb. 23, 1967, Ser.
No. 617,903
6 Claims. (Cl. 264—122)

ABSTRACT OF THE DISCLOSURE

A dry mix of one to fifteen parts by volume of hard rock particles, one part hydraulic cement and not more than 5% by volume of calcium chloride is prepared. The body of rock particles has a maximum particle size of ¼ inch with not more than 65% of such maximum size particles, and at least 25% of particles of minus 100 mesh. Not more than 15% by volume water is mixed into the dry mix, the resulting mass is divided into blocks, and each block compressed under a pressure of not less than 1000 p.s.i.

CROSS-REFERENCES TO RELATED APPLICATION

This application is a continuation-in-part of application Ser. No. 428,343, filed Jan. 27, 1965, and now abandoned.

BACKGROUND OF THE INVENTION (1) *Field of the invention.*—This invention is in the field of building blocks, wall and floor tiles and the like.

(2) *Description of the prior art.*—Conventional building bricks are usually made from mixes of clay or shale, sand and lime, or cement and lime. Compressive strength and water absorption qualities are subject to standard specifications, and these qualities, while it is desirable that improvement be made therein, are nevertheless subject to the inherent capacity of the brick itself.

Ceramic wall tiles of standard type are very brittle and require the formation thereon of a vitrified or glazed surface.

Vitreous mosaic tiles are also commonly used in the building trade but have limited compressive strength.

Precast concrete slabs and panels are also widely used in the building industry and, in addition to inherent strength characteristics of a limiting nature, are not suitable for use in structures of an intricate type.

SUMMARY OF THE INVENTION

The invention resides in a method of producing building blocks which consists essentially in dry mixing one to fifteen parts by volume of particles of rock selected from the group consisting of granite, quartz, feldspar, limestone, slate, marble, porphyry, sandstone, syenite, basalt, diabase, trachyte, dolomite, and gneiss with one part hydraulic cement and not more than 5% by volume of the final mixture of calcium chloride, said body of rock particles having a maximum particle size of ¼ inch with not more than 65% of particles of maximum size, and at least 25% of particles of minus 100 mesh, adding not more than 15% by volume water to the dry mix while mixing the water thereinto to form a damp homogeneous mass, dividing the mass into blocks, subjecting each said block to a compressing operation under a pressure of not less than 1000 p.s.i., and finally curing the block with steam under pressure.

BRIEF DESCRIPTION OF THE DRAWING

The single figure of the accompanying drawing is a flow sheet illustrating the method of the invention.

DESCRIPTION OF THE PREFERRED EMBODIMENTS

In accordance with the invention, there is employed, as a base material, particles of rock of hard type as distinguished from soft natural stones. Thus, the rock employed is selected from the group consisting of granite, quartz, feldspar, limestone, slate, marble, porphyry, sandstone, syenite, basalt, diabase, trachyte, dolomite, and gneiss.

The body of rock employed has a maximum particle size of ¼ inch with not more than 25% particles of maximum size and at least 25% by volume of particles of minus 100 mesh, Tyler Standard. Examples of suitable bodies of rock particles are:

(1) 50%—⅛" to ⅟₁₆"
    50%—minus 1000 mesh
(2) 20%—⅛" to ⅟₁₆"
    30%—⅟₁₆" to plus 200 mesh
    50%—minus 200 mesh to minus 1000 mesh
(3) 50%—minus 200 mesh
    50%—minus 1000 mesh
(4) 50%—⅟₁₆" to plus 200 mesh
    50%—minus 200 mesh to plus 1000 mesh
(5) 50%—minus 200 mesh
    25%—⅟₁₆"
    25%—⅛"
(6) 50%—⅟₁₆"
    50%—minus 200 mesh
(7) 75%—minus 200 mesh
    25%—⅛"
(8) 90%—minus 200 mesh
    10%—⅛" to ⅟₁₆"

It will be apparent that particle sizing will vary in accordance with the thickness of the article produced from the particular mix. Thus, for articles of ⅝" thickness, the maximum particle size will be ¼" with not more than 50% particles of such maximum size. The remaining particles of the mix will be graded downwardly to minus 100 or minus 200 mesh. For articles of ⅜" thickness, the maximum particle size will be ³⁄₁₆" with 50% of such particles, the remaining particles being graded downwardly in size. With articles of ¼" thickness, the maximum particle size will be ⅛" with a maximum of 65% of these particles. With articles of ⅛" thickness the maximum particle size will be ⅟₁₆" with a maximum of 75% of these particles.

The body of particles is thoroughly dried and mixed with a suitable proportion of any type of hydraulic cement, such as white or gray Portland cement. A satisfactory proportion is one volume of cement to approximately four volumes of rock particles. However, such proportion may vary from one part cement by volume to one to fifteen parts rock particles depending upon the particular use to which the finished brick or block is to be put and the particular rock or rocks employed for the base material. The usual range will be four to fifteen parts rock particles to one part cement.

A small amount of calcium chloride is preferably employed in the mix. This amount should not be more than 5% by volume of the final mixture and depends to some extent upon the amount of water employed. Thus, the amount of calcium chloride should not exceed 2% of the added water. The calcium chloride is an important ingredient of the mix in that it results in a block having a compression strength significantly greater than one in which calcium chloride is omitted. The exact role played by the CaCl in the mix has not been determined but there is no doubt as to its significant value.

Should it be desired to produce a brick or block of a particular color, the required amount of coloring material may be dry mixed with the rock particles and cement in dry state.

After the ingredients have been thoroughly dry mixed, a suitable amount of water in the form of a fine spray or mist is added to the dry mixture while the mixing operation is continued. Just enough water is added to form a homogeneous damp mass. Adding water beyond the stage where the mass is just damp is to be carefully avoided, inasmuch as all the water is intended to enter into chemical combination with the ingredients as water of crystallization, and substantially none should be left for evaporation. The amount of water added is approximately 8% to 15% by volume. For instance, if the basic mixture consists of rock particles and cement only, only about 5–8% water is required. Excessive water would tend to squeeze out of the dies in the subsequent pressing operation and would interfere with the desired application of high pressure. If a coloring agent were employed in the mix, excess water would tend to run down the faces of the brick or block and thus spoil the appearance thereof.

The damp plastic mass is then divided by any suitable mechanical means into block portions of appropriate size and placed in molds wherein the portions are subjected to a pressing operation under high pressure as by means of a mechanical or hydraulic rotary table press.

The pressure to which the portions are subjected in the press is at least 1000 p.s.i., and generally is of the order of 4000 to 6000 p.s.i. For instance, 1000 p.s.i. may be sufficient in forming blocks of ¼ inch thickness whereas, for thicker blocks, increased pressure would be required. Thus, for a brick 2½" thick, a pressure of about 9000 p.s.i. is required whereas for a block 8" thick, a pressure of 22,000 p.s.i. may be required.

The pressing operation places the particles of the mix into intimate contact with each other, the dust size particles filling all the voids between the granular particles and the moistened colloidal cement is forced by the relatively great pressure into intimate contact with the surfaces of the rock particles so as to form a solid homogeneous mass having substantially no interior or exterior pores. The bricks or blocks are then forced out of the molds by suitable mechanical means.

The compressed articles are now subjected to a curing operation in an atmosphere of steam under pressure. Thus, the articles are placed in an autoclave or other heating chamber at a temperature of at least 212° F. in an atmosphere of steam under pressure. Preferably, the heating chamber is maintained at a temperature of approximately 212° F. and a low pressure, say, 1 p.s.i. of steam for an initial period of time, and then the steam pressure is raised to 150–200 p.s.i., with a resultant rise in temperature to, say, 260°–300° F. for a further period of time.

For example, for non-colored articles, the initial period of treatment may be about 3 hours at a temperature of 212° F. and a steam pressure of 1 p.s.i. The second period of treatment is about 8 hours at a temperature of approximately 287°–300° F. and a steam pressure of 160 p.s.i.

For colored articles, the initial period may be about six hours at a temperature of 212° F. at a steam pressure of 1 p.s.i., and the second period is about 2 to 4 hours at a temperature of about 287°–300° F. and a steam pressure of 160 p.s.i. with colored articles, the longer initial period at low pressure is desired in order to avoid color fading.

After the curing treatment described, the articles are ready for shipment to the field of use or stock piling.

Articles produced in accordance with the formula set forth and the mode of treatment described possess a compressive strength of 2500 to 5000 p.s.i., and a moisture absorption degree of between 1 and 5%.

It may be desirable to employ, as a building brick or block for use in warmer climates, one which is somewhat porous whereby it has a "breathing" property. Such a porous article is subject to a more rapid cooling following absorption of heat. To this end, a quantity of particles not exceeding ⅟₁₆" in size of cinders, slag, or pumice stone is incorporated in the dry mix in the proportion of 10 to 40% depending upon the degree of porosity desired. The addition of water to such a mix is increased by 2 to 7%, that is, to 10 to 15% of the mix.

The following are examples of manners of carrying out the invention:

*Example 1*

A dry mixture is formed of the following ingredients:

25% of granite rock chips, ranging from ⅛" to ⅟₁₆" particle size;
25% of granite rock dust, minus 200 mesh;
27% of cinders of ⅟₁₆" maximum down to dust;
12% of hydraulic cement;
1% of calcium chloride;
Any desired small amount of powdered coloring material, depending on the color desired.

After thoroughly dry mixing these ingredients about 10% of water is added in the form of a fine spray while the mixing is continued until a homogeneous damp mass is formed. This damp mass is then divided and formed into sized portions and subjected to mechanical pressure as hereinabove set forth in the first described procedure. The suitably formed and compressed bricks or blocks are then piled onto platforms and subjected to steam pressure and temperature in a steam chamber as follows:

(1) Steam at approximately 212° F. and a pressure of 15 p.s.i. is maintained in the chamber for a period of 6 hours, (2) The steam pressure is increased to raise the temperature to about 230° F. and maintained for a period of 2 to 3 hours, (3) The steam pressure is again increased to raise the temperature to about 250° F. and maintained for a period of from 2 to 3 hours.

A brick produced in accordance with the Example 1 has a moisture absorption degree of about 10%. The formula set forth and the mode of curing in successive steps results in an extremely small pore size in the finished product and a very uniform pore distribution therein. Thus, the brick so produced has great resistance to chemical attack.

The following tabulation gives the result of tests of bricks made in accordance with the formula and procedure of Example I. The tests were made in an independent testing laboratory in accordance with the methods of A.S.T.M.C. 67–50 to meet requirements of A.S.T.M.C. 55–52. The bricks were of assorted colors and of a size 8½" by 4" by 2⅜", each containing ten ⅝" diameter cored holes.

MODULUS OF RUPTURE TESTS—A.S.T.M.C. 67

| Sample No. | Load in lbs. | Modulus of Rupture, p.s.i. |
|---|---|---|
| 1 | 1,060 | 493 |
| 2 | 1,180 | 549 |
| 3 | 1,120 | 521 |
| 4 | 975 | 454 |
| 5 | 1,365 | 635 |

COMPRESSIVE STRENGTH TESTS—A.S.T.M.C. 67

[One-half brick tested 4.25 x 4 inches]

| Sample No. | Area Sq. In. | Total Load, lbs. | Total Load, p.s.i. |
|---|---|---|---|
| 1 | 17.0 | 70,500 | 4,147 |
| 2 | 17.0 | 76,000 | 4,471 |
| 3 | 17.0 | 68,000 | 4,100 |
| 4 | 17.0 | 76,000 | 4,500 |
| 5 | 17.0 | 88,500 | 5,206 |
| Average | | | 4,485 |

Absorption—24 hours in cold water—A.S.T.M.C. 67—

| Sample No.: | Absorption, % |
|---|---|
| 1 | 9.6 |
| 2 | 10.3 |
| 3 | 9.8 |
| 4 | 11.5 |
| 5 | 9.4 |

Average 10.2%.

Absorption—5 hours in boiling water—A.S.T.M.C. 67—

| Sample No.: | Absorption, % |
|---|---|
| 1 | 13.4 |
| 2 | 14.2 |
| 3 | 13.9 |
| 4 | 14.4 |
| 5 | 13.7 |

Average 13.9%.

Saturation coefficient—C/B Ratio—A.S.T.M.C. 67—

| Sample No.: | Saturation coefficient |
|---|---|
| 1 | 0.71 |
| 2 | 0.77 |
| 3 | 0.74 |
| 4 | 0.78 |
| 5 | 0.68 |

Efflorescence Tests—A.S.T.M.C. 67—

| Sample No.: | Difference noted on comparison with unimmersed specimen |
|---|---|
| 1 | None |
| 2 | None |
| 3 | None |
| 4 | None |
| 5 | None |

Instead of cinders, slag or pumice stone of similar range of sizes may be used in the above formula.

To make brick having a lower or higher moisture absorption the proportion of cinders, or slag, or pumice stone of, respectively, lower or higher proportion, may be used in the above formula.

The proportion of calcium chloride used may be varied up to 2% of total solids to obtain the desired control of resistance to disintegration of cracking due to the action of the elements.

*Example II*

To produce a brick or block having a moisture absorption of 2% or less, the following formula and procedure may be followed:

A dry mixture of the following ingredients may be used:

34% of rock particles of approximately 1/8" to 1/16";
45% of rock particles of minus 200 mesh;
12% of hydraulic cement;
A suitable amount of dry color ingredients;
1% of calcium chloride.

To this dry mixture a fine spray of water up to 8% is added while the mixing continues as in the form of the process first described.

The mixture is formed into compressed portions in the manner previously described and similarly subjected to a curing operation wherein the initial treatment is for a period of about 6 hours at a temperature of approximately 212° F. and a steam pressure of 1 p.s.i. A second period of treatment is about 3 hours at a steam pressure of 15 p.s.i. and a temperature of about 250° F. A third period of treatment of about 3 hours is at a steam pressure of approximately 200 p.s.i. with resultant rise in temperature.

It will be apparent that the pressure in the compressing step will be dependent upon the thickness of the article under treatment. Thus, for a tile of, say, one inch in thickness, the minimum pressure of 4,000 p.s.i. may be employed whereas for a brick of approximately two inches thick, a pressure of 6,000 p.s.i. would be employed. For blocks of greater thicknesses correspondingly greater pressures would be used.

*Example III*

| Composition of mix: | Approximate percent volume |
|---|---|
| Limestone particles (20%—1/8" to 1/16"; 30%—1/16" to plus 200 mesh; 50%—minus 200 mesh to plus 1000 mesh) | 44 |
| Cement | 10 |
| Cinders (1/16" to plus 400 mesh) | 30 |
| Calcium chloride | 1 |
| Water | 15 |
| Total | 100 |

Compression applied: Approximately 6000 p.s.i.
Steam pressure: 160 lbs. for about 8 hours.

*Example IV*

| Composition of mix: | Approximate percent volume |
|---|---|
| Equal parts of limestone and marble particles minus 200 mesh to plus 1000 mesh with at least 50% minus 200 mesh | 69 |
| Cement | 20 |
| Water | 10 |
| Calcium chloride | 1 |
| Total | 100 |

Compression applied: 1500 p.s.i.
Steam under pressure for 8 hours.

The blocks produced in accordance with Examples III and IV were extremely hard with a smooth polish-like surface.

The particle sizing herein specified is of critical significance. If particles larger than 1/4" size are employed, or if more than 65% 1/4" particles are used, the particles will crack or fracture under the pressures employed and result in a much inferior product. Moreover, at least 25% of particles of minus 100 mesh is required if the strength characteristics desired are to be achieved. It will be apparent that in any final dry mix employed in accordance with the invention, there will be at least 25% by volume thereof of particles of minus 100 mesh. The commercial cements employed are generally 95% minus 200 mesh. No sand is ever used in the mix since it has been found that it adversely affects the properties of the product.

I claim:

1. A method of producing building blocks which consists essentially in dry mixing one to fifteen parts by volume of particles of rock selected from the group consisting of granite, quartz, feldspar, limestone, slate, marble, porphyry, sandstone, syenite, basalt, diabase, trachyte, dolomite, and gneiss, with one part hydraulic cement and not more than 5% by volume of the final mixture of calcium chloride, said body of rock particles having a maximum particle size of 1/4 inch with not more than 65% of particles of maximum size, and at least 25% of particles of minus 100 mesh, adding not more than 15% by volume water to the dry mix while mixing the water thereinto to form a damp homogeneous mass, dividing the mass into blocks, subjecting each said block to a compressing operation under a pressure of not less than 1000 p.s.i. but insufficient to fracture said particles, and finally curing the block with steam under pressure at a temperature of 212° F. to 300° F. to produce a product containing said rock particles in said size range.

2. A method of producing building blocks as defined in claim 1, wherein the proportion of said rock particles to said cement is approximately four to one.

3. A method of producing building blocks as defined in claim 1, wherein said water is added in the proportion of about 5 to 8% by volume.

4. A method of producing building blocks as defined in claim 1, wherein said body of rock particles has a maximum particle size of ⅛ inch with not more than 50% of particles of ⅛ inch and at least 50% of particles of minus 200 mesh.

5. A method of producing building blocks as defined in claim 1, wherein said body of rock particles has a maximum particle size of ⅛ inch with about 25% of particles of ⅛ inch to ¹⁄₁₆ inch and about 75% of particles of minus 200 mesh.

6. A method of producing building blocks as defined in claim 1, wherein said mix contains 10 to 40% by volume of crushed cinders having a particle size not exceeding ¹⁄₁₆ inch.

References Cited

UNITED STATES PATENTS

| 1,711,027 | 4/1929 | Luzzatti et al. | 264—336 X |
| 1,805,431 | 5/1931 | Ryder | 106—97 |
| 3,199,992 | 8/1965 | Moffitt | 264—44 X |

FOREIGN PATENTS 437,146  10/1935  Great Britain.

ROBERT F. WHITE, *Primary Examiner.*

J. A. FINALYSON, J. R. HALL, *Assistant Examiners.*